US012455206B2

(12) United States Patent
Garzon et al.

(10) Patent No.: US 12,455,206 B2
(45) Date of Patent: Oct. 28, 2025

(54) REMOTE METHANE DETECTOR (71) Applicant: JOHN CRANE UK, LIMITED, Slough (GB)

(72) Inventors: Pedro Andres Garzon, San Jose, CA (US); Andrew Chanul Kim, Fremont, CA (US); Samit K. Basu, Fremont, CA (US); Kimberly Adair Swift, Riverview, FL (US); Rebecca Ann Steinmann, Katy, TX (US)

(73) Assignee: John Crane UK, Limited, Slough (GB)

( * ) Notice: Subject to any disclaimer, the term of this patent is extended or adjusted under 35 U.S.C. 154(b) by 489 days.

(21) Appl. No.: 18/045,582

(22) Filed: Oct. 11, 2022

(65) Prior Publication Data

US 2023/0128536 A1 Apr. 27, 2023

Related U.S. Application Data

(63) Continuation of application No. PCT/US2022/077872, filed on Oct. 11, 2022.

(60) Provisional application No. 63/262,386, filed on Oct. 11, 2021.

(51) Int. Cl.
*G01M 3/04* (2006.01)
*G01N 33/00* (2006.01)

(52) U.S. Cl.
CPC ......... *G01M 3/04* (2013.01); *G01N 33/0047* (2013.01)

(58) Field of Classification Search
CPC ....... G01M 3/04; G01M 3/16; G01N 33/0047
See application file for complete search history.

(56) References Cited

U.S. PATENT DOCUMENTS

| 2016/0334353 A1 | 11/2016 | Potyrailo |
| 2017/0090486 A1* | 3/2017 | Chrin ................. G01N 33/0036 |
| 2017/0370891 A1 | 12/2017 | Yoo |
| 2018/0180518 A1 | 6/2018 | Joseph, Jr. |
| 2019/0187020 A1 | 6/2019 | Green et al. |
| 2019/0219554 A1 | 7/2019 | Chang |
| 2019/0353593 A1 | 11/2019 | Ryu |

(Continued)

OTHER PUBLICATIONS

Scientific Aviation, "SOOFIE Dashboard User Guide", May 2021, 9 pages.

(Continued)

*Primary Examiner* — Xin Y Zhong
(74) *Attorney, Agent, or Firm* — Saul Ewing LLP; Brian R. Landry (57) ABSTRACT

A remote methane detector is described herein. The remote methane detector includes an external shell defining an interior cavity. The remote methane detector also includes an airflow aperture. The remote methane detector also includes a methane sensor disposed within the interior cavity, wherein the methane sensor is adapted and configured to receive airflow from the airflow aperture and to detect methane within the airflow. The remote methane detector also includes a rechargeable power source. The remote methane detector also includes a low-energy telecommunications transceiver chain. The remote methane detector also includes an energy collector adapted and configured to collect renewable energy and to power at least the methane sensor and the low-energy telecommunications transceiver chain.

12 Claims, 8 Drawing Sheets

(56) References Cited

U.S. PATENT DOCUMENTS

2020/0060397 A1* 2/2020 Gharabegian .......... G06F 3/165
2022/0205964 A1   6/2022 Conley et al.
2024/0339021 A1* 10/2024 Cooper ................ G08B 29/185

OTHER PUBLICATIONS

Scientific Aviation, "SOOFIE—Systematic Observations of Facility Intermittent Emissions", Installation Guide Version 2.0i, Aug. 2021, 17 pages.
Boyd, G., "Methane Emissions Detection, GEO-Location and Quantification", Sep. 28, 2022, 12 pages.
Gore , "Improve Your Equipment's Reliability and Durability", Gore® Protective Vents, Adhesive Series VE8, VE7 and VE9, Oct. 11, 2021, 6 pages.
International Search Report and Written Opinion, International Patent Application No. PCT/US2022/077872, Mar. 3, 2023.
Communication pursuant to Rule 164(1) EPC, Partial Supplementary European Search Report, European Patent Application No. 22881940.5, Aug. 1, 2025.

* cited by examiner

REMOTE METHANE DETECTOR

CROSS-REFERENCE TO RELATED APPLICATION

The present application is a continuation under 35 U.S.C. § 120 of International Application No. PCT/US2022/077872, filed Oct. 11, 2022, which claims priority to U.S. Provisional Patent Application No. 63/262,386, filed Oct. 11, 2021, which is incorporated herein by reference in its entirety.

BACKGROUND

Methane detectors can detect trace amounts of methane in an environment by implementing a methane sensor (e.g., a catalytic bead or infrared sensor). However, methane detectors typically are installed as permanent components of a structure or facility, such as a methane processing plant and the like. Further, methane detectors typically are hardwired for powering the components of the detector, as well as for conveying information related to the detector (e.g., received sensor measurements). Thus, certain characteristics of typical methane detectors cause the detectors to be incompatible with remote sensing of methane.

SUMMARY

One aspect of the present disclosure provides a remote methane detector. The remote methane detector includes an external shell defining an interior cavity. The remote methane detector also includes an airflow aperture. The remote methane detector also includes a methane sensor disposed within the interior cavity, wherein the methane sensor is adapted and configured to receive airflow from the airflow aperture and to detect methane within the airflow. The remote methane detector also includes a rechargeable power source. The remote methane detector also includes a low-energy telecommunications transceiver chain. The remote methane detector also includes an energy collector adapted and configured to collect renewable energy and to power at least the methane sensor and the low-energy telecommunications transceiver chain.

In certain embodiments, the remote methane detector further includes a nozzle coupled to the airflow aperture, the nozzle being adapted and configured for facilitating the airflow to pass through, and for preventing water and debris from entering, the interior cavity. In certain embodiments, the remote methane detector further includes a microcontroller in electronic communication with the methane sensor, wherein the microcontroller is adapted and configured to: receive sensor measurements from the methane sensor; and determine a methane level based on the sensor measurements. In such embodiments, the microcontroller is further adapted and configured to collect the sensor measurements according to a sampling schedule. In such embodiments, the sampling schedule can be dependent on: a battery charge level of the rechargeable power source; whether methane is detected in a location of the remote methane detector within a predefined time period; an operating schedule of one or more operating vehicles or devices; whether methane is detected by another remote methane detector within a predefined time period; and/or whether the methane level exceeds a methane level threshold. In other such embodiments, the microcontroller is further adapted and configured to determine a location of the methane leak from the sensor measurements.

In certain embodiments, the low-energy telecommunications transceiver chain includes a Bluetooth Low Energy transceiver chain. In certain embodiments, the energy collector includes a solar panel, a wind turbine, a kinetic energy cell, a geothermal turbine, or a combination thereof. In certain embodiments, the energy collector is mounted on an external surface of the external shell. In certain embodiments, the remote methane detector is constructed and arranged to identify a concentration level of methane within the airflow. In certain embodiments, the exterior shell is constructed and arranged for implementation in a hazardous location. In certain embodiments, the remote methane detector further includes a GPS system adapted and configured to receive satellite communications. In certain embodiments, the remote methane detector further includes an anemometer adapted and configured to detect a wind speed and/or a wind direction. In certain embodiments, the airflow aperture is defined by a portion of the external shell.

Another aspect of the present disclosure provides a mobile methane detector system, including a robotic system coupled to, and configured to transport, the remote methane detector.

Another aspect of the present disclosure provides a remote methane detection system. The remote methane detection system includes two or more of the remote methane detectors, wherein each of the remote methane detectors are adapted and configured to wirelessly communicate with each other.

Another aspect of the present disclosure provides a system for localizing a gas leak. The system includes a plurality of remote gas detectors. The system also includes a server communicatively coupled to the plurality of remote gas detectors, the server programmed to: receive a measurement of wind direction within a region having a gas leak; receive one or more gas measurements from the plurality of remote gas detectors positioned within the region; and identify a sub-region bounded by at least four of the plurality of remote gas detectors. At least one of the at least four of the plurality of remote gas detectors is an upwind detector based on the measurement of wind direction and has not detected an elevated gas level. At least one of the at least four of the plurality of remote gas detectors is a downwind detector based on the measurement of wind direction and has detected an elevated gas level.

In certain embodiments, the system further includes a plurality of gateways configured to wirelessly communicate with at least one of the plurality of remote gas detectors or the server.

Another aspect of the present disclosure provides a computer-implemented method of predicting a methane-leak failure mode. The computer-implemented method includes the steps of: i) receiving a set of data, including operational conditions for methane-handling infrastructure and methane-plume characteristics from a methane leak detected in proximity to the methane-handling infrastructure; and ii) analyzing the set of data using a machine-learning classifier, wherein the machine-learning classifier has been previously trained to distinguish between methane-leak failure modes based on a training set comprising: operational conditions for methane-handling infrastructure, methane-plume characteristics, and methane-leak failure modes.

In certain embodiments, the operational conditions comprise operational volume. In certain embodiments, the methane-leak failure modes comprise a specification of a failed component. In certain embodiments, the methane-plume characteristics include one or more selected from the group consisting of: a volume, a two-dimensional area, a maximum cross-sectional dimension, and a two-dimensional aspect ratio.

BRIEF DESCRIPTION OF THE DRAWINGS

For a fuller understanding of the nature and desired objects of the present disclosure, reference is made to the following detailed description taken in conjunction with the accompanying drawing figures wherein like reference characters denote corresponding parts throughout the several views.

DEFINITIONS

The instant invention is most clearly understood with reference to the following definitions.

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used in the specification and claims, the terms "comprises," "comprising," "containing," "having," and the like can have the meaning ascribed to them in U.S. patent law and can mean "includes," "including," and the like.

Unless specifically stated or obvious from context, the term "or," as used herein, is understood to be inclusive.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

DETAILED DESCRIPTION

Remote methane detectors are described herein. The methane detectors can include a methane sensor positioned within a cavity of an exterior shell. The exterior shell can facilitate airflow into the shell's cavity, while also preventing water or debris from entering the cavity. The methane detector can also utilize alternative energy sources, such as wind, solar, geothermal, and the like, which can facilitate the use of the methane detector remotely. The methane detector can also include a wireless transceiver chain for wireless communications, which can further facilitate remote operation.

Figure 1:
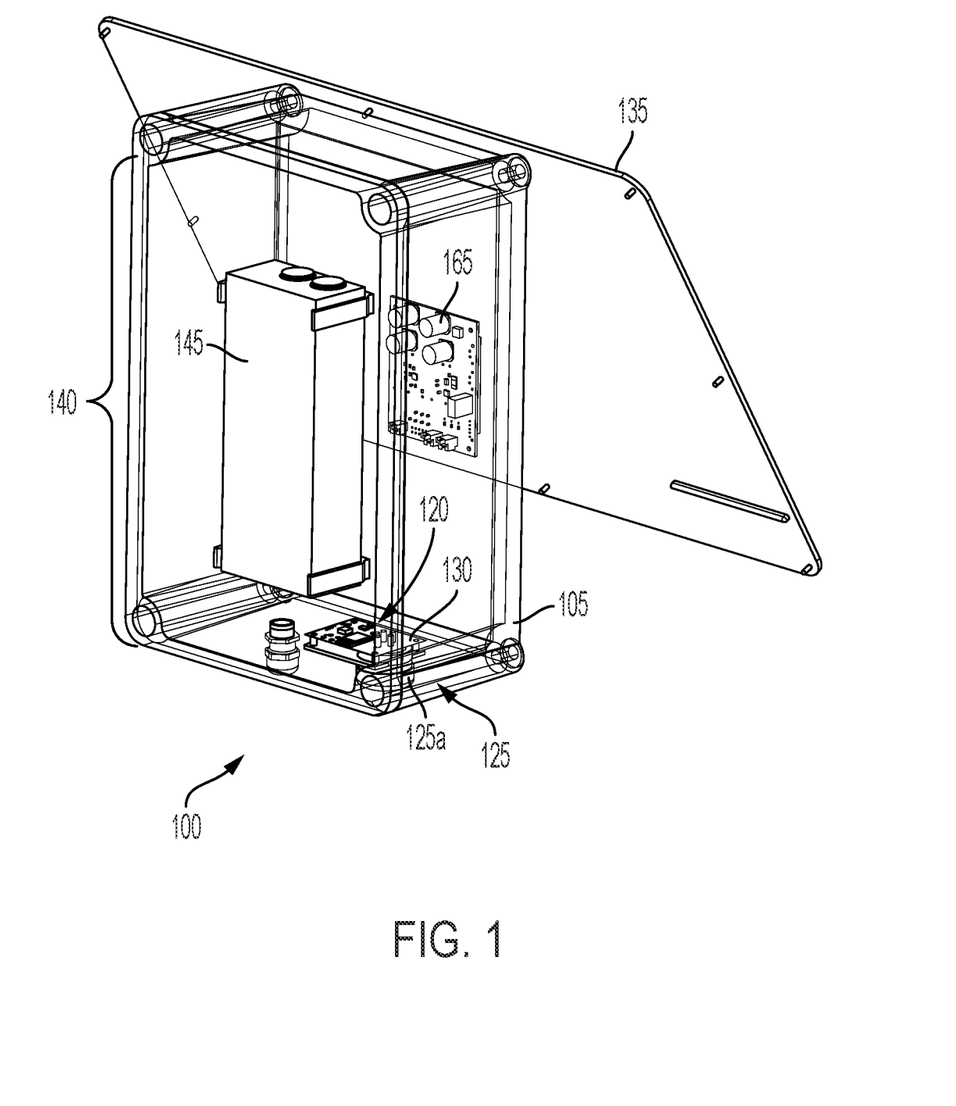
FIG. 1 depicts a remote methane detector according to an embodiment of the present disclosure.

Referring now to FIG. 1, a methane detector 100 (e.g., a remote methane detector) is illustrated, in accordance with certain embodiments of the present disclosure.

Shell

The methane detector 100 can include an exterior shell 105. The shell 105 can encapsulate other components of the methane detector 100. The shell 105 can be composed of a weather-proof composition, such as stainless steel, polymers, and the like. The shell 105 can also define an airflow aperture (i.e., a hole not visible in FIG. 1). The airflow aperture can be configured to receive airflow from outside the shell 105 into a cavity 140 defined by the exterior shell 105. Further, the airflow aperture can, in some cases, also be configured to pass the airflow from the cavity 140 to the ambient environment. In some cases, the cavity can house a fan, or a fan can be external to the shell 105, that further facilitates airflow through the airflow aperture, into the cavity 140, and the like.

While the figures depict an exterior shell 105 of approximately a rectangular box, one skilled in the art will understand that the size and shape of the exterior shell 105 can differ based on the desired implementation of the methane detector 100. For example, it may be desirable for a rectangular box exterior shell 105 in scenarios where the methane detector 100 will be a standalone device in a relatively large environment (e.g., a room of a building or a processing plant). However, there may be scenarios where the exterior shell 105 can be tailored for a particular position. For example, the exterior shell 105 can be a cylindrical or semi-cylindrical shape. This type of shape may be desirable when the intended location or positioning of the detector is to be near piping, or a narrow area such as between walls, and the like. Further, in some cases, the exterior shell 105 can be constructed and arranged for use in a hazardous condition, such as in industrial settings (e.g., methane production plants, oil rigs, fuel pipelines, and the like).

Methane Sensor

The methane detector 100 can also include a methane sensor 120 positioned within the cavity. The methane sensor 120 can be, for example, an optical gas analyzer (OGI), a catalytic bead, infrared sensor, a Tunable Diode Laser Analyzer (TDLA), etc. The methane sensor 120 can receive the airflow from ingress aperture (e.g., through an aperture nozzle 125) and measure methane levels (e.g., methane concentration levels in PPM) within the airflow. In certain embodiments, methane sensor 120 can detect 100 PPM or higher without false positives or false negatives. In certain embodiments, methane sensor 120 can have a 50 PPM LoD (Limit of Detection) in certain environmental conditions. In certain embodiments, de-noising algorithms may be applied to the sensors (and/or to the output data therefrom) to enable accuracy (e.g., 50 PPM LoD) in environmental conditions with heightened noise. In certain embodiments, a sensor can have a false-alarm rate of less than 0.0015%.

Further, the methane sensor 120 may be positioned within the cavity 140 to be in the line with the airflow and/or between the ingress aperture and an optional egress aperture (e.g., a vent). Thus, the position of the methane sensor 120 may be variable, and may be based on the position of the ingress aperture 110, the egress aperture, or both (e.g., see FIGS. 8A-8B for an illustration of a methane sensor and two apertures).

In some cases, the methane detector 100 can include other sensors in lieu of, or in addition to, the methane sensor 120. For example, the methane detector 100 can include a sensor for detecting hydrocarbon levels in the airflow. In some cases, the methane detector 100 can include a sensor for detecting nitrous oxide in the airflow. In some cases, the methane detector 100 can include an anemometer adapted and configured to detect a wind speed and/or a wind direction.

Aperture Nozzle

The methane detector can also include an aperture nozzle 125 adjacent or coupled to the airflow aperture. The aperture nozzle 125 can include a nozzle body 125a. The nozzle body 125a can define a lumen (not illustrated), and can include an exterior cross-section perimeter that is relatively the same size and shape as the ingress aperture (e.g., or the egress aperture is coupled to the egress aperture). The nozzle body 125a can be positioned such that a portion of the nozzle body 125a (and defined lumen) is external to the cavity 140 of the exterior shell 105. In some cases, a length of the body 125a (and lumen) can be large enough such that a portion of the nozzle body 125a is also internal to the cavity 140 of the exterior shell 105.

The aperture nozzle 125 can also include at least one ring (e.g., a filter, a shield, etc.). The ring can be relatively the same shape as the nozzle body 125a, and can have a slightly larger cross-sectional perimeter than the nozzle body 125a. The ring can be disposed over the nozzle body 125a and be in contact with the exterior shell 105 surface defining the airflow aperture. Thus, the ring can prevent liquids from entering the cavity of the exterior shell 105. In some cases, aperture nozzle 125 can include multiple rings, for example one ring contacting the inner surface of the exterior shell 105 and another ring contacting the outer surface of the exterior shell 105. In some cases, the rings can be separate from the nozzle body 125a, for example, the disposing of O-rings onto the nozzle body 125a/exterior shell 105. In other cases, the rings and nozzle body 125a can be one component (e.g., formed as a single body).

In some embodiments, the aperture nozzle 125 and/or the airflow aperture includes a filter, membrane, or the like adapted and configured to permit flow of the gas(es) of interest while excluding liquid water, water vapor, salt water, dust, debris, and the like. In one embodiment, the membrane is a PTFE membrane, such as an expanded PTFE (ePTFE) commercially available under the GORE® or GORE-TEX® trademark from W. L. Gore & Associates.

Wireless Transceiver Chain

The remote methane detector 100 can also include a wireless transceiver chain 130 (e.g., a low-energy telecommunications transceiver chain). The wireless transceiver chain 130 can include components for receiving, transmitting, and processing of telecommunication signals for the remote methane detector 100. For example, the transceiver chain 130 can include one or more antennae, amplifiers, filters, mixers, attenuators, detectors, and the like. In some cases, the transceiver chain 130 may be configured for implementing a low energy wireless protocol, such as Bluetooth Low Energy (BLE), Zigbee, ANT, LoRa, and the like.

The wireless transceiver chain 130 can receive and transmit wireless communications to and from the remote methane detector 100. For example, the remote methane detector 100 can generate and transmit wireless communications based on signal measurements received from the methane sensor 120. In another example, the remote methane detector 100 may be configured to generate and transmit wireless communications based on methane signal measurements above a predefined threshold (e.g., on the ppm scale). The transmitted communications may include information corresponding to measured methane levels, for example, measured methane values (e.g., methane concentration), time of measurements, history logs of measurements, and the like. In some cases, the transmitted communications may also include status information of the methane detector 100, for example, battery storage percentage and condition, transceiver condition, methane sensor 120 condition (e.g., temperature), environmental conditions (e.g., temperature, humidity, airflow, etc.) and the like.

Processing

In some cases, the remote methane detector 100 can also include one or more processors configured to receive and process sensor measurements from the methane sensor 120. For example, a microcontroller (e.g., located on or within wireless transceiver chain 130, having one or more processors, memory, and the like) can be in electronic communication with the methane sensor 120. The microcontroller can receive measurements from the methane sensor 120 and process the sensor measurements to determine methane levels from the airflow. In some cases, the microcontroller can determine whether the methane levels exceed a predefined threshold (e.g., an emergency or danger level). Further, in some cases the microcontroller can activate the methane sensor 120, receive measurements from the methane sensor 120, log measurements of the methane sensor 120, or a combination thereof, according to a sampling schedule.

The sampling schedule can be based on a variety of factors. For example, the sampling schedule can be dependent on: a battery charge level of the methane detector 100, whether methane has been detected in the area where the methane detector 100 is located, an operating schedule nearby operating assets (industrial vehicles, industrial devices, and the like), whether other remote methane detectors 100 have recently detected methane levels, and the like. For example, the methane detector 100 can obtain a measurement every hour by default, but obtain a measurement every minute after an elevated measurement is obtained. Protocols may be implemented to strike an optimal balance between battery life and the detection of methane (or another target gas).

In some cases, the methane detector 100 can transmit data to cloud resources. For example, instead of microcontroller processing the sensor measurements, the methane detector 100 may transmit the sensor measurements (e.g., via the wireless transceiver chain 130) to a cloud resource, such as a cloud server. The cloud server may process the measurements and store and/or transmit the processed data to other electronic entities (e.g., user device, cloud databases, and the like). Data may be transmitted to cloud resources according to a schedule that may be dependent on various factors, such as battery life and whether or how recently methane has been detected, either by the methane detector 100 itself or a nearby methane detector. Generally speaking, the data transmission schedule may be optimized between battery life and the prompt transmission of positive methane detection information.

In some embodiments, the methane detector 100 can generate an alert and/or alarm regarding methane levels. Such alert or alarm can be an electronic message communicated over a network, an electromagnetic signal, an electromagnetic wave of a certain frequency (e.g., a radio signal), an audible signal, a visual signal (e.g., a flashing light), and the like. As discussed herein, the behavior of the methane detector 100 can change (e.g., with regard to measurement, communication, power usage, and the like) in response to an alert/alarm.

Energy Collector

Figure 2:
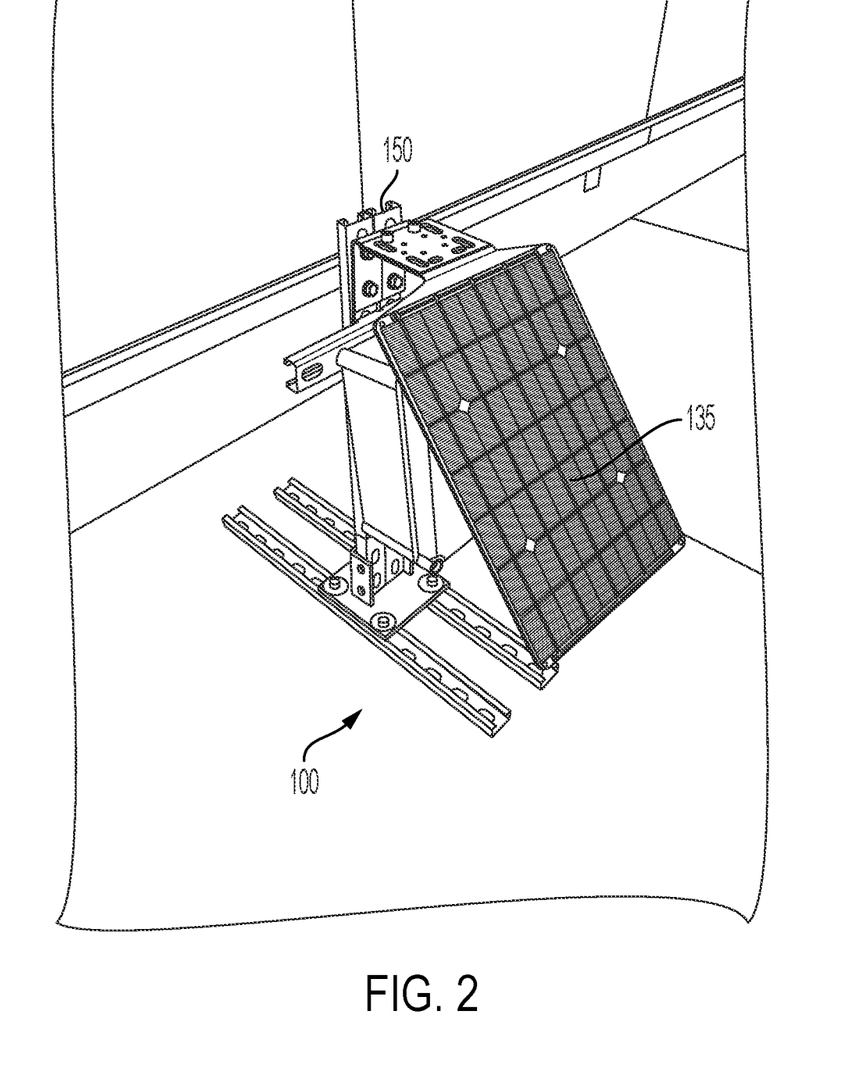
FIGS. 2 and 3 depict photographs of remote methane detectors according to embodiments of the present disclosure.
Figure 3:
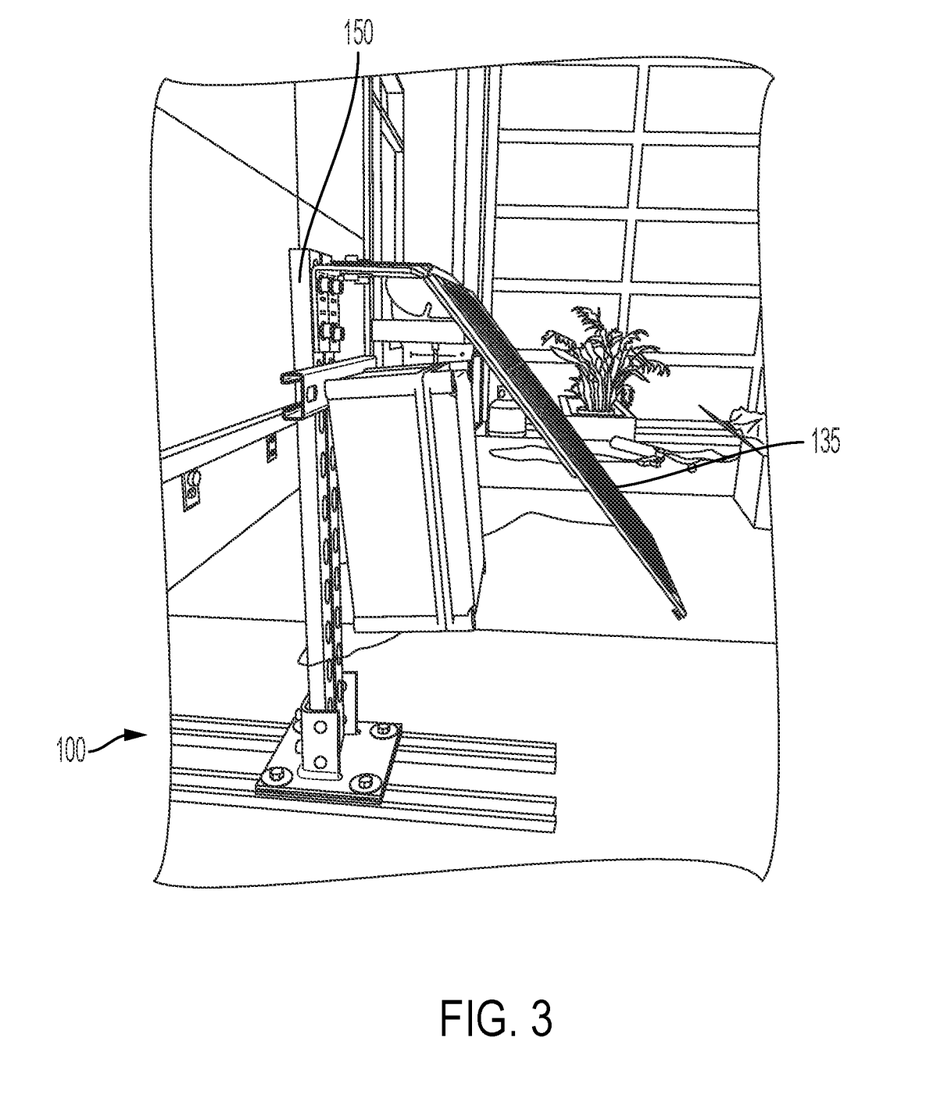

The remote methane detector 100 can also include an energy collector 135. The energy collector 135 can be adapted and configured to collect renewable energy and power at least the methane sensor 120 and the wireless transceiver chain 130 (e.g., a low-energy telecommunications transceiver chain). The energy collector 135 can collect energy from various less conventional energy sources to power the components of the remote methane detector 100. For example, the energy collector 135 can collect solar, wind, geothermal, vibrational energy, and the like. Depending on the type of energy collected, the energy collector 135 can take different forms. For example, as depicted in FIGS. 1-3, energy collector 135 can be a solar panel coupled to the exterior shell 105. The solar panel can collect solar energy and store the energy in a power source 145 (e.g., a rechargeable power source, a battery, etc.). Power source 145 can be positioned inside the cavity or external to the cavity. However, the energy collector 135 can also include a wind turbine for collecting wind energy, a geothermal turbine for collecting geothermal energy, a piezoelectric harvester for collecting vibrational energy, and the like. The energy collector 135 can be selected based on the type of energy source present at the desired location for the remote methane detector 100. Further, multiple types of energy collectors can be implemented, for example, a solar panel and a piezoelectric harvester can both be implemented with a remote methane detector 100.

The energy collector 135 can also include a power source 145 (e.g., a battery) for storing the collected energy. The power source 145 (e.g., a battery) can be coupled to the electronic components of the methane detector 100, for example, the methane sensor 120, the wireless transceiver chain 130, an airflow fan if present, and the like. The power source 145 (e.g., a battery) can power these electronic devices via the stored energy of the energy collector 135.

The methane detector 100 can also include a power manager 165 (e.g., power management board) coupled with the energy collector(s) 135, the power source 145 (e.g., a battery), and the other electronic components to collect, store, and provide electricity having the parameters (e.g., voltage) desired. Exemplary power managers are described in U.S. Patent Application Publication Nos. 2011/0006603, 2011/0007491, and 2012/0151240, the content of which is incorporated herein.

Frame

The methane detector 100 can also include a frame 150 for supporting the methane detector 100. For example, as depicted in FIGS. 2 and 3, the methane detector 100 can be coupled to a frame 150 that can support the weight of the methane detector 100 and provide additional stability for the methane detector 100. In some cases, the frame 150 can be in the form of a robot that can transport the methane detector 100 to different locations. In some cases, the robotic frame can be remote-controlled, for example, via the wireless transceiver chain 135. In other cases, the frame 150 can be part of an unmanned aerial vehicle (UAV), an unmanned ground vehicle (UGV), etc.

Methane Detection System

Figure 4:
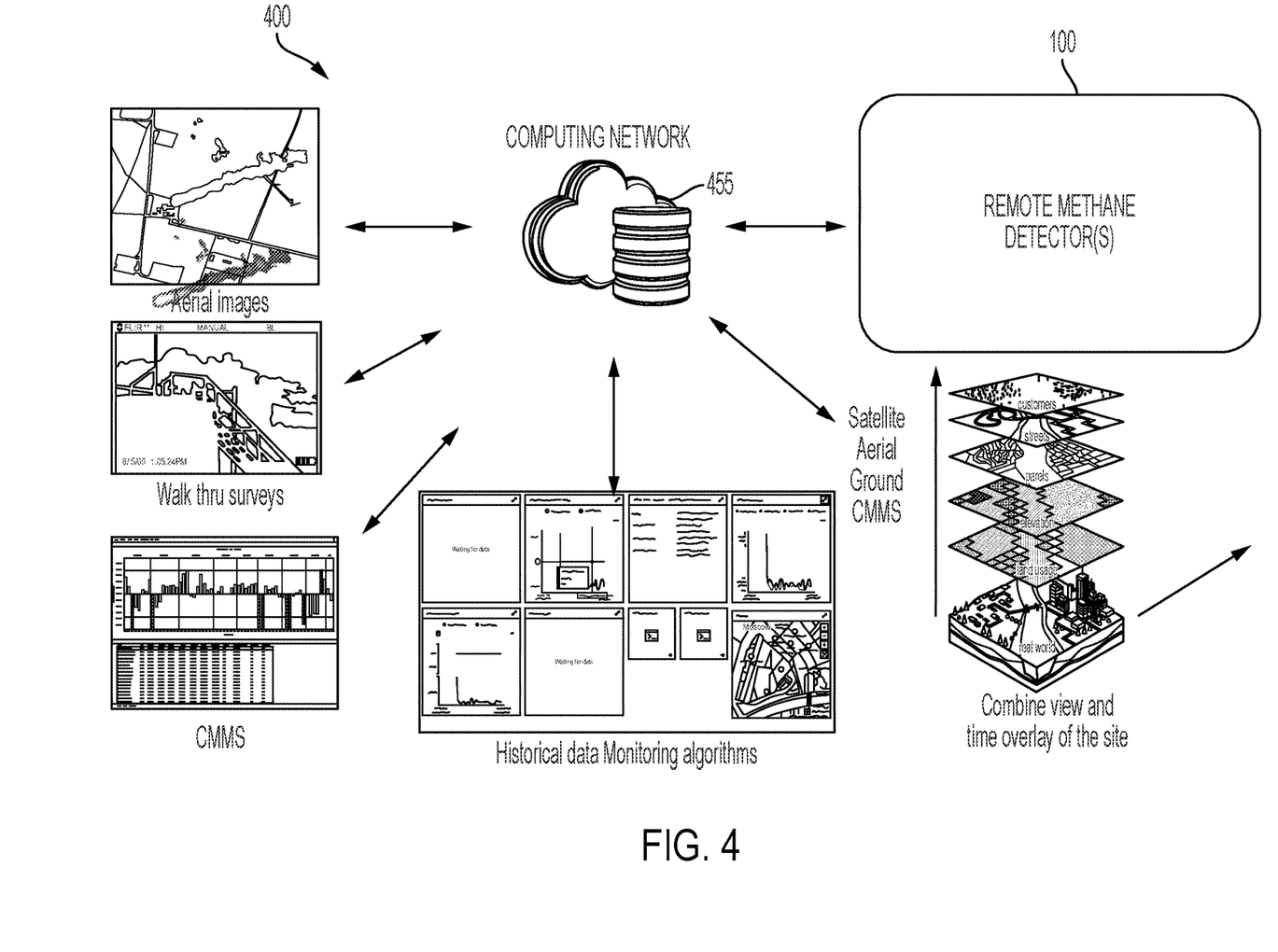
FIG. 4 depicts a methane detection system according to an embodiment of the present disclosure.

In some cases, the remote methane detector 100 can be a component of a methane detection system 400, as illustrated in FIG. 4. In some cases, the methane detection system 400 can include one or more remote methane detectors 100 in communication with a computing network 455. In some cases, the computing network 455 can be a cloud network (e.g., a cloud-computing network, a "cloud", etc.). In some cases, the computing network 455 can be a data core system (DCS). For example, a remote methane detector can be hardwired to a DCS server. In some cases, the methane detection system 400 can implement a fit-for-purpose, open platform for providing on-going end-to-end LDARM$^2$ services.

In some cases, the methane detection system 400 can include one or more edge devices. The edge device can receive communications from the remote methane detector 100 (e.g., via a low-energy communication protocol), and relay the communications to a computing network (e.g., computing network 455), such as a cloud network (e.g., via a cellular communication protocol), a mesh network, and the like.

As illustrated in FIG. 4, computing network 455 of methane detection system 400 is configured to interact with other data structures. For example, computing network 455 can use aerial images (e.g., depicting air flow based on spectrometry, IR or thermal imaging) to inform a plurality of remote methane detectors 100 (e.g., by decreasing the number of samples collected per minute, by increasing the number of samples collected per minute, etc.). Similarly, computing network 455 can use locally obtained thermal images (e.g., from walk through surveys, grounded photographs, grounded video streams, etc.) to inform a plurality of remote methane detectors 100.

Computing network 455 can use historical data monitoring algorithms (e.g., data from NOAA, regional meteorological data, etc.) or CMMS (Computerized Maintenance Management System) to inform a plurality of remote methane detectors 100. Computing network 455 can use a plurality of data structures (e.g., from satellite, aerial, ground, CMMS, etc.) in a combined data structure (e.g., overlaying views, time, etc.) and/or CMMS to inform a plurality of remote methane detectors 100 and/or the user (e.g., a safety monitor).

Cloud Architecture

In embodiments where computing network 455 is a cloud, methane-detection system 400 can be configured to have a cloud-agnostic capability. In other words, methane detection system 400 can be configured to include or interact with a plurality of different cloud architectures. A cloud stack is configurable and flexible to integrate with customer clouds. Cloud can push and pull data to and from hardware (e.g., firmware updates) and to and from customer dashboard (e.g., user-input emissions data).

Figure 5A:
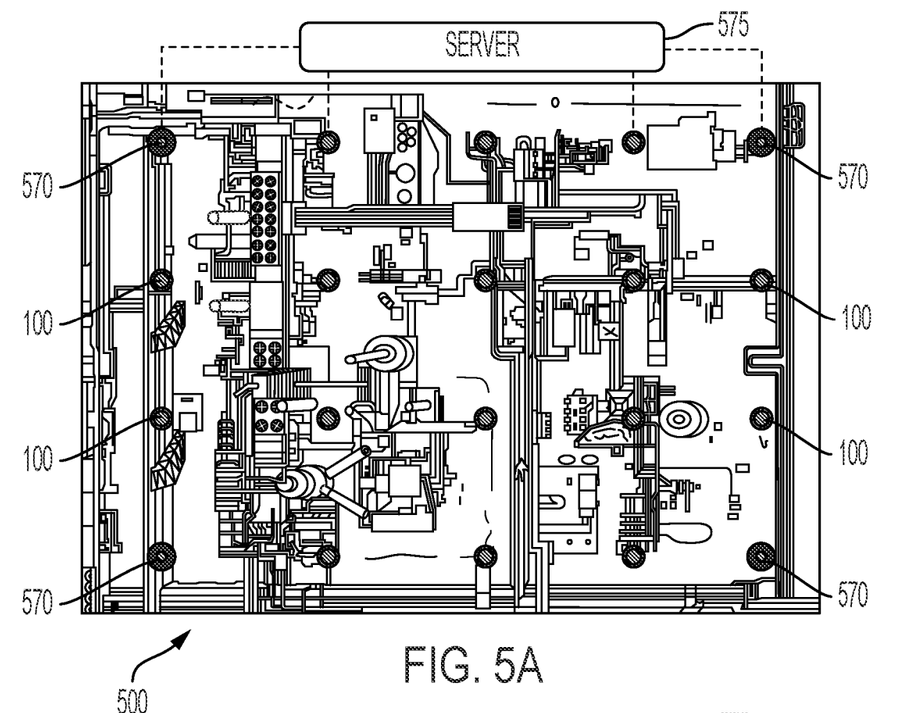
FIGS. 5A-5B depict a system for localizing a gas leak according to an embodiment of the present disclosure.
Figure 5B:
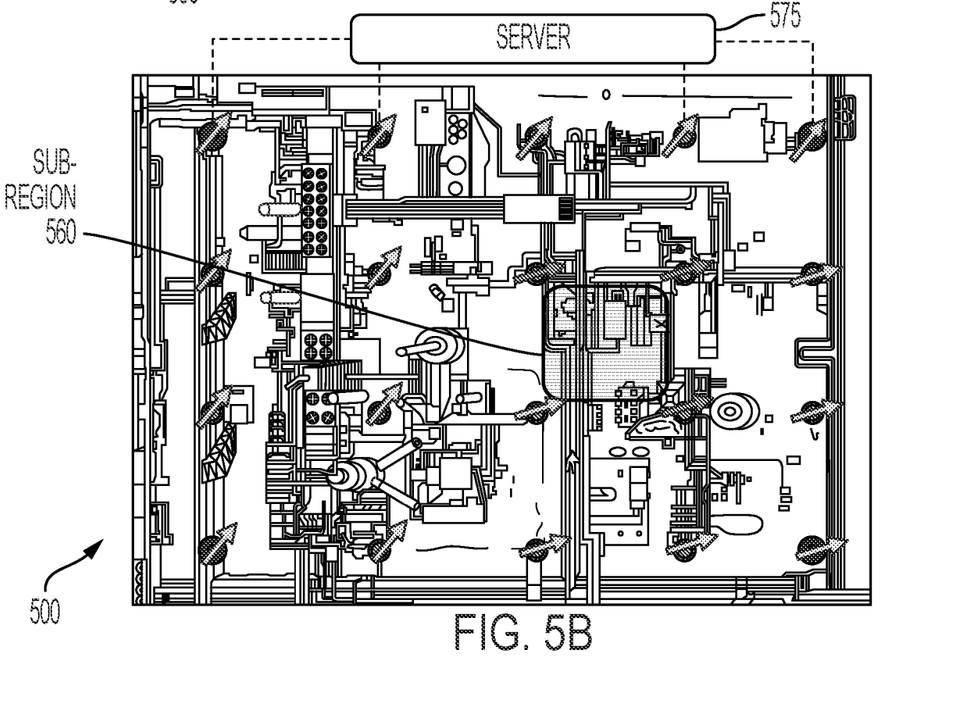

Referring now to FIGS. 5A-5B, a system 500 for localizing a gas leak is illustrated. The system 500 includes a plurality of remote methane detectors 100 (e.g., as illustrated in FIGS. 1-3). The system 500 also includes a server 575 (which can be computing network 455 of FIG. 4) communicatively coupled to the plurality of remote methane detectors 100. The server 575 can be programmed to receive a measurement of wind direction (e.g., illustrated as arrows or vectors in FIG. 5B) within a region (e.g., the general region depicted in FIGS. 5A-5B) having a gas leak (e.g., a methane gas leak). The server 575 can receive one or more gas measurements from the plurality of remote methane detectors 100 positioned within the region. The server 575 can identify a sub-region 560 bounded by at least four of the plurality of remote methane detectors 100. In certain embodiments, at least one of the at least four of the plurality of remote methane detectors 100 is an upwind detector based on the measurement of wind direction and has not detected an elevated gas level. In certain embodiments, at least one of the at least four of the plurality of remote methane detectors 100 is also a downwind detector based on the measurement of wind direction and has detected an elevated gas level.

Figure 6A:
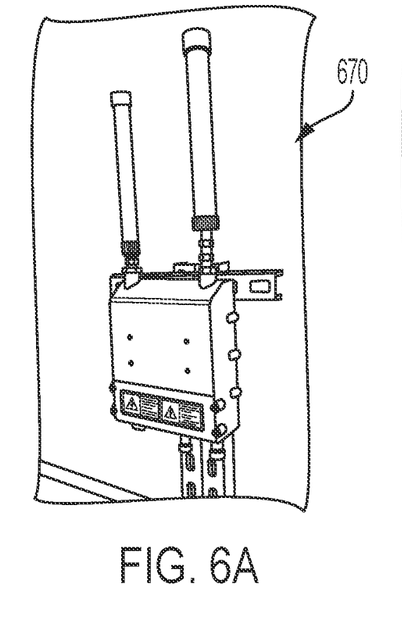
FIGS. 6A-6B depict a gateway for transmitting data according to an embodiment of the present disclosure.
Figure 6B:
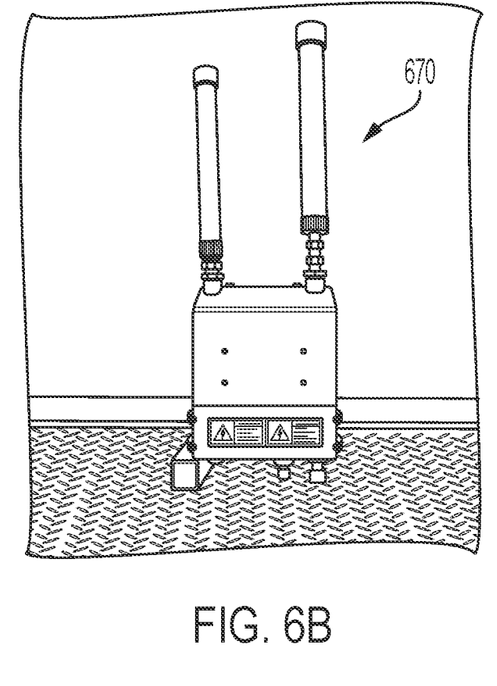
Figure 6C:
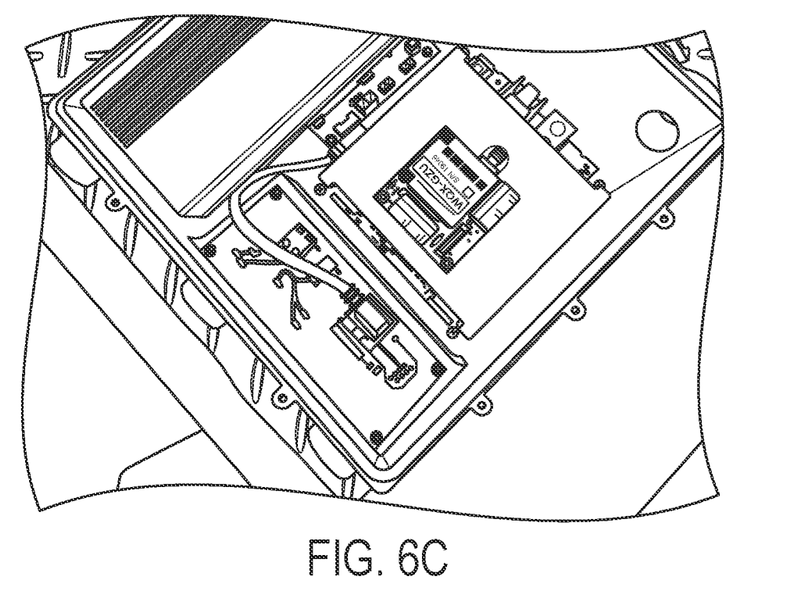
FIG. 6C depicts a transceiver according to an embodiment of the present disclosure.

In certain embodiments, system 500 can also include a plurality of gateways 570 (e.g., see FIGS. 6A-6B) configured to communicate (e.g., wirelessly, using a cellular connection, using a satellite connection, using a radio connection, etc.) with at least one of the plurality of remote gas detectors 100 and/or a server (e.g., server 575). In certain embodiments, the plurality of remote gas detectors 100 may be described as an IIoT methane sensor (e.g., communicatively coupled with other detectors using BLE, Wi-Fi, etc.).

Description of Data Management Platform

Methane detectors (e.g., remote methane detector 100) can use a visualization tool available to enable and/or enhance decision-making from the data collected. Users (e.g., companies, site operators, maintenance operators, engineers, technicians, etc.) striving to detect, monitor, localize, quantify, mitigate, repair, and report emissions data can use a single platform which enables tracking and interacting with such data or information. A single platform can be preferable over other platforms which focus on parts of a workflow, such as detection through quantification, reporting, mitigation and/or repair. A single platform can support full emissions management workflow, automating at least some steps, and using machine learning (ML) to support decision-making. A platform can include a single computing device, a computer network, etc.

A computer-implemented method of predicting a methane-leak failure mode is best described in connection with FIGS. 4 and 5A-5B. The computer-implemented method includes the step of: receiving a set of data. The set of data can include operational conditions for methane-handling infrastructure (e.g., see the graphic illustrated "historical data monitoring algorithms" and/or "CMMS" of FIG. 4). The set of data can also include methane-plume characteristics from a methane leak detected in proximity to the methane-handling infrastructure (e.g., see the graphic labeled "aerial images" and or "Combine view and time overlay of the site" of FIG. 4).

The computer-implemented method can also include the step of: analyzing the set of data using a machine-learning classifier. The machine-learning classifier can be previously trained to distinguish between methane-leak failure modes based on a training set including: operational conditions for methane-handling infrastructure, methane-plume characteristics, and/or methane-leak failure modes. For example, the arrows of FIG. 5B indicate the direction (i.e., the orientation of the arrows) and magnitude (i.e., the color/shade of the arrows) of a methane-plume. A machine-learning classifier can be trained to recognize that the data from the plurality of methane detectors 100 surrounding sub-region 560 may be different from another plurality of methane detectors 100 surrounding another region (e.g., where methane readings are greater in one plurality of methane detectors 100 as compared to another plurality of methane detectors 100).

In certain exemplary embodiments, the operational conditions can include operational volume. In certain exemplary embodiments, the methane-leak failure modes can include a specification of a failed component (e.g., a differentiating between a leak caused by a failed seal vs. a failed pump). In certain exemplary embodiments, the methane-plume characteristics can include one or more of: a volume, a two-dimensional area, a maximum cross-sectional dimension, and a two-dimensional aspect ratio.

User Interface

Figure 7:
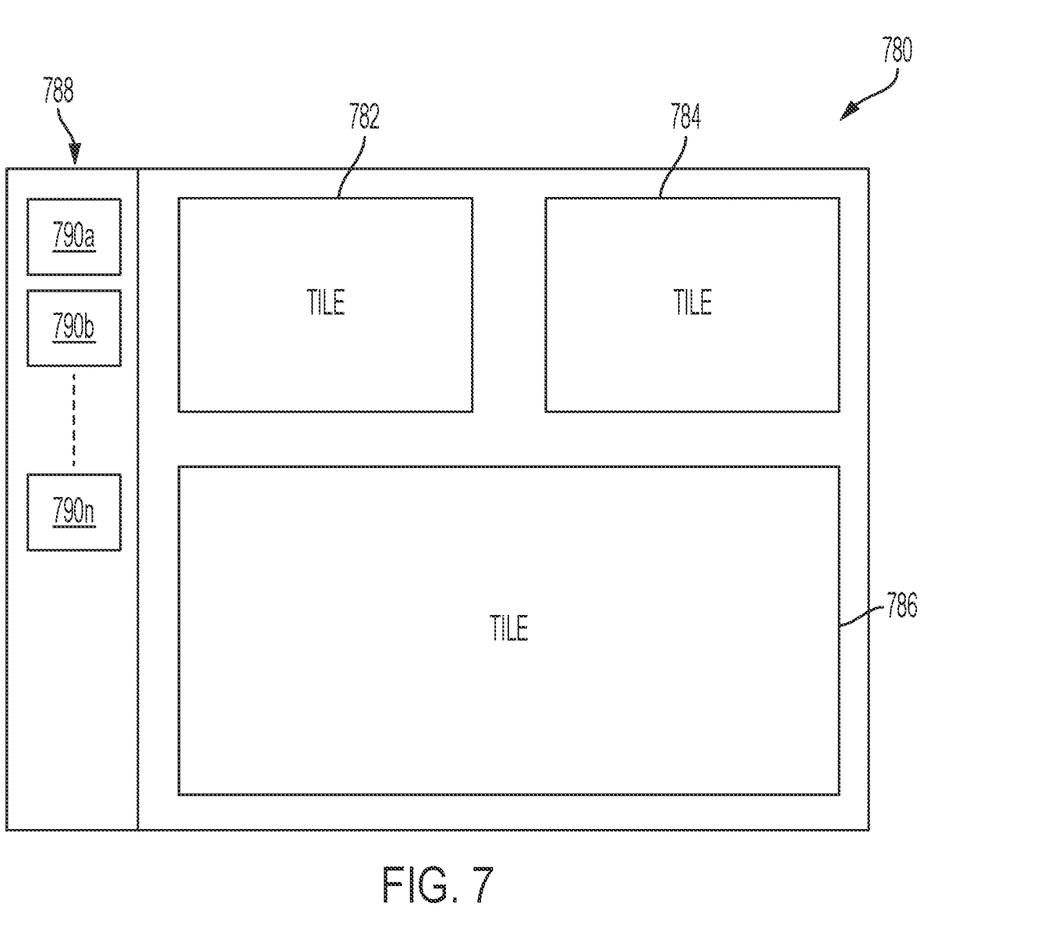
FIG. 7 depicts a user interface according to an embodiment of the present disclosure.

Referring now to FIG. 7, a user interface 780 is illustrated. User interface 780 (e.g., a graphical user interface, a dashboard, etc.) can be used in connection with the methane detection system (e.g., methane detection system 400) of the present disclosure. User interface 780 can be a web application accessible (e.g., by a user, an operator, a customer, etc.) via a computing device, personal computer (PC), smart phone, tablet, or another electronic device. User interface 780 can be accessed using user access validation and other security protocols to ensure privacy and confidentiality of data (e.g., customer data). For example, two-factor authentication, login expiration dates, and other security protocols can be used.

A user can customize the user interface 780, including: tile arrangement; axes adjustment; zoom function for any graph or chart; data filters (e.g., month, site type, etc); ability to save dashboard layout; and other customization features. For example, tile 782 can be a map of sites, a site avatar, etc. Tile 784 can be a list, a graph, a chart, etc. Tile 786 can be an image gallery. The size and position of any of tiles 782, 784, and 786 can be changed, as desired. Dashboard selection menu 788 can illustrate a selection of dashboard layouts 790a, 790b, through 790n.

A user's dashboard can include a map with bubbles at each of the user's sites. A user can click on a site to see an avatar of a site (e.g., a 3D model, aerial photo, scaled site drawing, etc.) with fixed monitoring equipment illustrated and site-specific multi-modal emissions data. The emissions data sources can include files from fixed-point sensors, robots, handheld cameras, drones, planes, satellites, manually-entered data, or other suitable data. In certain embodiments, the data may be continuous (i.e., continuously monitored). Other dashboard elements can include graphs or charts illustrating methane concentrations, total methane emissions, emissions intensity, $CO_2$ emissions, and $CO_2eq$ emissions. Other dashboard elements can include image galleries for leaks.

User interface 780 can be configured based on the assigned a role type of the user, thereby providing different dashboards for different users or different role types. For example, an equipment operator who may be addressing a leak may only need a dashboard that provides the location of the leak. In another example, an operations manager or a site manager may need data from a plurality of methane sensors.

User interface 780 can be configured to give a user the ability to set push notifications (e.g., SMS, email, smart phone notifications, or other notifications) for themselves, coworkers, or other stakeholders depending on the assigned user role.

User interface 780 (and associated electronic or computing components) can be configured to allow a user to see radius, location and plume of leak detected via a continuous monitoring system. The platform can record the entirety of a leak for storage in a network (e.g., a "cloud" network). Such recorded data can give a user information such as where the leak is happening, over time problems may occur and can ultimately discover a root cause.

User interface 780 (and associated electronic or computing components) can be used in connection with a web application including a bug-submission form, a customer-feedback form, or another form providing data manually.

Data Integration and Outputs

User interface 780 can include a data form for the user to enter data (e.g., metadata) for a site or leak (e.g., site name, asset name, GPS coordinates, etc.). User interface 780 (and associated electronic or computing components) can be configured to interact with (e.g., upload or download) of various file types including .xls, .csv, .txt and detection-modality specific file types (e.g., file types associated with OGI cameras, drones, etc.). In certain embodiments, emissions data can be exported via .xls or .csv files. Relevant data for emissions reporting to governments, NGOs, and corporate stakeholders can be pre-populated (or post-populated) in the appropriate form for printing and/or electronic submission. A dashboard (e.g., of user interface 780) can be configured to be printed or saved by a user (e.g., to pdf, to a WORD® or .docx file, etc.).

Processing

User interface 780 (and associated electronic or computing components) can be configured to provide all emissions data in time-synced presentation and to enable historical record and analysis of emissions management. The platform can receive maintenance and operations data and use ML to identify patterns and correlations potentially causing leaks. For example, a ML algorithm can be programed to detect and predict pump failures. Operations readings (such as pressure, temperature, and flowrate) can change slowly over time (e.g., due to sensor degradation, gradual changes in environmental conditions, etc.). Over time, additional considerations (e.g., maintenance readings, maintenance frequency, flaring from gas) can be used to detect a root cause failure and prospectively improve operations.

The platform can be configured to calculate $CO_2$eq using an editable or user-input global warming potential for methane over a time-scale (e.g., in years). The platform can be configured to calculate methane intensity for a specific asset, at site-level, or various regions therebetween.

User interface 780 (and associated electronic or computing components) can be configured to provide application ("app") analytics of dashboard components for use in prioritizing features in a release update.

Figure 8A:
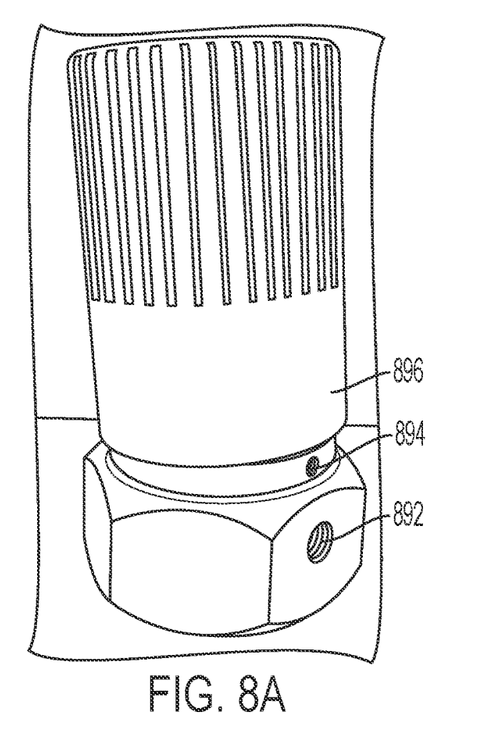
FIGS. 8A-8B depict a methane sensor and related components according to an embodiment of the present disclosure.
Figure 8B:
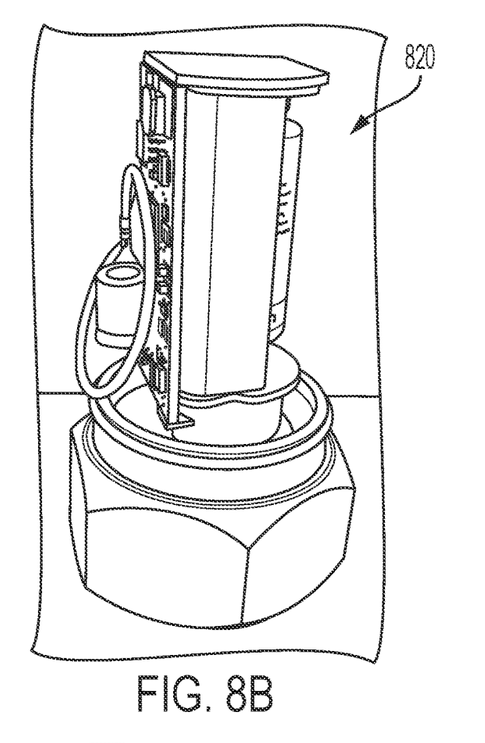

Referring now to FIGS. 8A-8B an embodiment of a methane sensor 820 is illustrated. Methane sensor 820 is similar in many respects to methane sensor 120 described in connection with FIG. 1. Methane sensor 820 is configured to interact with aperture 892 and aperture 894. Methane sensor 820 is illustrated covered by an enclosure 896 (e.g., a plastic enclosure, a 3D printed enclosure, a metallic enclosure, etc.) such that undesired gases (e.g., ambient air) are prevented from interacting with methane sensor 820. In certain applications, a sample to be measured is pulled in through aperture 892 and pushed out of aperture 894. In certain applications, a sample to be measured is pulled in through both apertures 892 and 894. In certain applications, enclosure 896 fully covers aperture 894 and a sample to be measured is pulled in through only aperture 892 (and optionally exited through the same).

Figure 9:
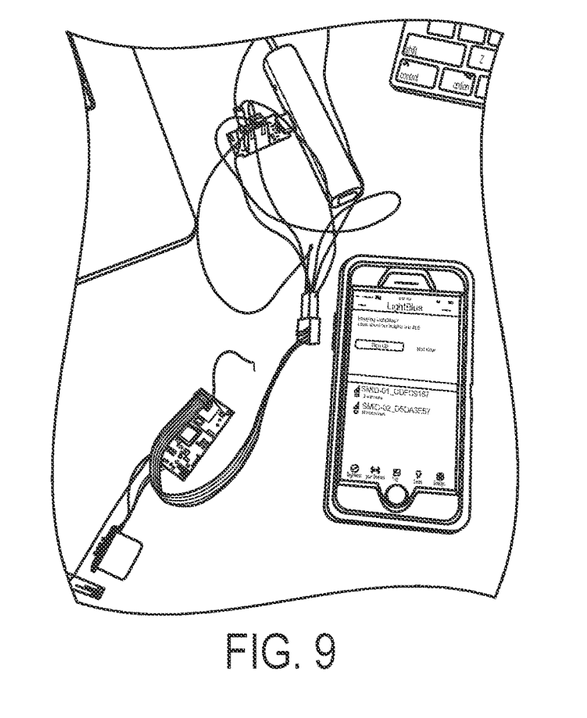
FIG. 9 depicts a circuit board and related components used in connection with a methane detector according to an embodiment of the present disclosure.

Referring now to FIG. 9, a clearer view of a circuit board (e.g., a printed circuit board or PCB) is illustrated in the bottom left. The circuit board has a sensor connected to it via soldered wires. An adapter, used for loading software onto the board, is illustrated connected to the board. The phone illustrates that the board can send Bluetooth advertisements and the other components supported in software installation.

EQUIVALENTS

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference.

The invention claimed is:

1. A remote methane detector, comprising:
 an external shell defining an interior cavity;
 an airflow aperture;
 a methane sensor disposed within the interior cavity, wherein the methane sensor is adapted and configured to receive airflow from the airflow aperture and to detect methane within the airflow;
 a rechargeable power source;
 a low-energy telecommunications transceiver chain; and
 an energy collector adapted and configured to collect renewable energy and to power at least the methane sensor and the low-energy telecommunications transceiver chain;
 a microcontroller in electronic communication with the methane sensor, wherein the microcontroller is adapted and configured to:
  receive sensor measurements from the methane sensor; and
  determine a methane level based on the sensor measurements;
 wherein the microcontroller is further adapted and configured to collect the sensor measurements according to a sampling schedule, wherein the sampling schedule is dependent on whether methane is detected by another remote methane detector within a predefined time period.

2. The remote methane detector of claim 1, wherein the sampling schedule is dependent on a battery charge level of the rechargeable power source.

3. The remote methane detector of claim 1, wherein the sampling schedule is dependent on whether methane is detected in a location of the remote methane detector within a predefined time period.

4. The remote methane detector of claim 1, wherein the sampling schedule is dependent on an operating schedule of one or more operating vehicles or devices.

5. The remote methane detector of claim 1, wherein the sampling schedule is dependent on whether the methane level exceeds a methane level threshold.

6. The remote methane detector of claim 2, wherein the microcontroller is further adapted and configured to:
 determine a location of a methane leak from the sensor measurements.

7. The remote methane detector of claim 1, wherein the energy collector comprises a solar panel, a wind turbine, a kinetic energy cell, a geothermal turbine, or a combination thereof.

8. The remote methane detector of claim 1, wherein the remote methane detector is constructed and arranged to identify a concentration level of methane within the airflow.

9. The remote methane detector of claim 1, further comprising:
 a GPS system adapted and configured to receive satellite communications.

10. The remote methane detector of claim 1, further comprising:
 an anemometer adapted and configured to detect a wind speed and/or a wind direction.

11. A mobile methane detector system, comprising:
a robotic system coupled to, and configured to transport, the remote methane detector of claim 1.

12. A remote methane detection system, comprising:
two or more of the remote methane detectors of claim 1, wherein each of the remote methane detectors are adapted and configured to wirelessly communicate with each other.

* * * * *